Dec. 31, 1946.  J. A. DOCKRY  2,413,487
BUD SHIELD
Filed Oct. 26, 1944

Inventor
John A Dockry

By Clarence A O'Brien
and Harvey B. Jacobson
Attorneys

Patented Dec. 31, 1946

2,413,487

UNITED STATES PATENT OFFICE 2,413,487

BUD SHIELD

John A. Dockry, Painesville, Ohio

Application October 26, 1944, Serial No. 560,430

1 Claim. (Cl. 47—23)

This invention relates to a bud shield, and more particularly to such a shield adapted to be utilized in horticultural industry.

A primary object of this invention is the provision of a bud shield, adapted to protect buds of a plant, a tree or the like, from bruising, damage or other injury, as while being shipped or stored.

An additional object of this invention is the provision of such a bud shield which will be relatively strong and durable, and thoroughly efficacious for protecting such buds from injury.

As conducive to a clearer understanding of this invention it may here be pointed out that in certain horticultural industries, such as rose growing or the like, it has hitherto been customary to transplant rose plants for stock in the propagation of roses, by shipping sections of the stalk thereof, with the roots attached, the plants being shipped after their second season of growth. By means of the instant invention a live bud may be transplanted directly on the stalk and the plant shipped after the first season, the guard precluding bruising or damage to the buds occasioned by rough handling during shipping, thus effecting a material saving in time, expense, and shipping weight.

Other objects will in part be obvious and in part be pointed out as the description of the invention proceeds and shown in the accompanying drawing, wherein there is disclosed a preferred embodment of this inventive concept.

In the drawing—

Like reference numerals refer to like parts throughout the several views of the drawing.

Figure 1:
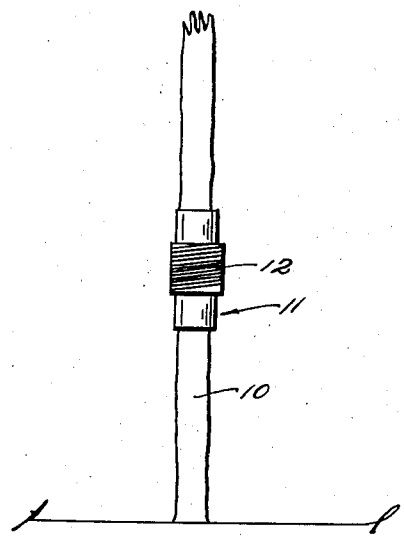
Figure 1 is a fragmentary side elevational view of a stalk as of a rose plant or the like showing the shield of the instant invention positioned thereon.
Figure 2:
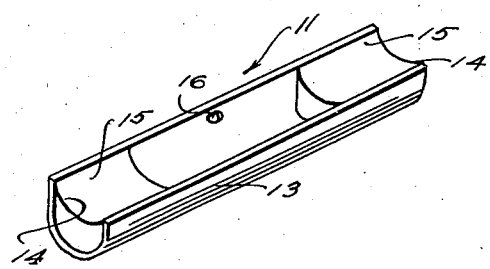
Figure 2 is a perspective view of the bud shield, as viewed from the inner or stalk abutting side.

Having reference now to the drawing, there is indicated at 10 the stalk of a rose plant or the like, to which is secured the bud shield, which is generally indicated at 11, of the instant invention, as by a cord, rubber band or the like, wrapped therearound. Having particular reference now to Figure 2, the shield 11 is comprised of a metallic member 13, of semi-cylindrical form, at the opposite extremities of which are positioned a pair of shields or packing members 14, comprised of felt or some similar relatively soft material, and having arcuate interior surfaces 15 of concave configuration, adapted to rest closely adjacent the stalk 10. A hole or aperture 16 in the side of the shield 13 is adapted to be engaged by one end of the band or string 12.

From the foregoing the method of use of the device should now be readily understandable. The bud is either selected or positioned on the stalk 10, and the shield 11 positioned therearound, in such manner that the bud fits snugly in the recess between the end caps or closure members 14, the relatively heavy metal shield 13 serving to protect the same effectively from injury. The band 12 is now wound tightly around the shield and the stalk 10, and its extremity secured in any desired manner, whereupon the stalk 10 is ready for shipment and the bud associated therewith effectively protected against accidental bruising or corresponding damage.

From the foregoing it will now be seen that there is herein provided a device accomplishing all the objects of this invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A bud shield including a relatively hard semi-cylindrical casing adapted to be secured to the side of a plant stem to overlie a bud, spaced cushioning bearing plugs positioned in the opposite ends of said casing forming a semi-cylindrical bud protecting recess, said plugs being adapted to have bearing engagement with the surface of a plant stem, and means for securing said casing to said plant stem.

JOHN A. DOCKRY.